United States Patent
Ohlsson et al.

(10) Patent No.: US 11,665,633 B2
(45) Date of Patent: May 30, 2023

(54) EFFICIENT PLMN ENCODING FOR 5G

(71) Applicant: TELEFONAKTIEBOLAGET LM ERICSSON (PUBL), Stockholm (SE)

(72) Inventors: Oscar Ohlsson, Stockholm (SE); Christofer Lindheimer, Vadstena (SE); Malik Wahaj Arshad, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/140,480

(22) Filed: Jan. 4, 2021

(65) Prior Publication Data

US 2021/0127326 A1    Apr. 29, 2021

Related U.S. Application Data

(63) Continuation of application No. 16/650,763, filed as application No. PCT/IB2018/057581 on Sep. 28, 2018, now Pat. No. 10,887,832.

(Continued)

(51) Int. Cl.
*H04W 4/00*          (2018.01)
*H04W 48/18*         (2009.01)
(Continued)

(52) U.S. Cl.
CPC ........... *H04W 48/18* (2013.01); *H04W 48/12* (2013.01); *H04W 84/042* (2013.01)

(58) Field of Classification Search
CPC .... H04W 48/18; H04W 48/12; H04W 84/042
(Continued)

(56) References Cited

U.S. PATENT DOCUMENTS 8,731,557 B2 *  5/2014  Svedevall ............. H04W 36/22
                                                     455/435.2
9,717,031 B2 *  7/2017  Centonza ............. H04W 36/30
                        (Continued)

FOREIGN PATENT DOCUMENTS

CN    101808397 A    8/2010
CN    102238699 A    11/2011
(Continued)

OTHER PUBLICATIONS

CATT, Summary of Offline discussion #08 on coding of PLMNs list, R2-1806439, 3GPP TSG-RAN WG2 Meeting #101bis, Sanya, China, Apr. 16-20, 2018.

(Continued)

*Primary Examiner* — Amancio Gonzalez

(57) ABSTRACT

A method for decoding PLMN information comprises receiving a message comprising PLMN information for a plurality of cells and determining PLMN information from the message for a first group of cells that comprises at least one cell, each cell of the first group of cells associated with a first core network type. The method further comprises determining PLMN information from the message for a second group of cells that comprises at least one cell, each cell of the second group of cells associated with a second core network type. At least one cell is a part of the first group of cells and the second group of cells. The PLMN information for the at least one cell in the first group of cells and the second group of cells is provided only once.

10 Claims, 10 Drawing Sheets

Related U.S. Application Data

(60) Provisional application No. 62/564,483, filed on Sep. 28, 2017.

(51) Int. Cl.
*H04W 48/12* (2009.01)
*H04W 84/04* (2009.01)

(58) Field of Classification Search
USPC .......................................................... 455/434
See application file for complete search history.

(56) References Cited

U.S. PATENT DOCUMENTS

| | | | |
|---|---|---|---|
| 10,638,273 B2* | 4/2020 | Lee | H04L 1/1614 |
| 10,701,585 B2* | 6/2020 | Wang | H04W 48/16 |
| 10,887,832 B2* | 1/2021 | Ohlsson | H04W 48/18 |
| 10,952,126 B2* | 3/2021 | Li | H04W 48/12 |
| 2011/0263252 A1* | 10/2011 | Saini | H04W 48/16 |
| | | | 455/434 |
| 2015/0341833 A1* | 11/2015 | Palanisamy | H04W 48/20 |
| | | | 455/436 |
| 2018/0167918 A1* | 6/2018 | Ishii | H04W 48/12 |
| 2019/0059026 A1* | 2/2019 | Huang-Fu | H04W 48/12 |
| 2019/0380087 A1* | 12/2019 | Park | H04W 48/08 |
| 2020/0112908 A1* | 4/2020 | Li | H04W 48/08 |

FOREIGN PATENT DOCUMENTS

| | | |
|---|---|---|
| CN | 106797612 B | 2/2020 |
| EP | 2809102 A1 | 12/2014 |
| WO | 2016163971 A1 | 10/2016 |
| WO | 2016195617 A1 | 12/2016 |
| WO | 2017137657 A1 | 8/2017 |

OTHER PUBLICATIONS

ZTE, Consideration on CN type indication, R2-1708151, 3GPP TSG-RAN WG2 Meeting #99, Berlin, Germany, Aug. 21-25, 2017.

Ericsson, Encoding of broadcasted system information, Tdoc R2-1706502 (Revision of R2-1704389), 3GPP TSG-RAN WG2 Ad Hoc on NR#2, Qingdao, China, Jun. 27-29, 2017.

3GPP TS 36.331 V14.3.0, 3rd Generation Partnership Project; Technical Specification Group Radio Access Network Evolved Universal Terrestrial Radio Access (E-UTRA); Radio Resource Control (RRC); Protocol specification (Release 14), Jun. 2017.

ZTE Consideration on CN Type Indication, 3rd Generation Partnership Project (3GPP) TSG-RAN WG2 Meeting #99, Berlin, Germany, R2-1708151, Aug. 21-25, 2017.

Catt, CN Type Selection in LTE Connectivity to 5G-CN, R2-1708245, 3GPP TSG RAN WG2 Meeting #99, Berlin, Germany, Aug. 21-25, 2017, Ericsson, CN selection when accessing, Tdoc R2-1707796, 3GPP TSG-RAN WG2 #99, Berlin, Germany, Aug. 21-25, 2017.

Qualcomm Incorporated, Preventing Legacy LTE UEs from camping on eLTE Cells & PLMNs connected to New 5G Core Network only, 3GPP TSG-RAN2 Meeting #99, R2-1707786, Berlin, Germany, Aug. 21-25, 2017.

* cited by examiner

EFFICIENT PLMN ENCODING FOR 5G

RELATED APPLICATIONS

This application is a continuation of U.S. application Ser. No. 16/650,763, filed Mar. 25, 2020, which is a 371 of International Application No. PCT/IB2018/057581, filed Sep. 28, 2018, which claims the benefit of U.S. Application No. 62/564,483, filed Sep. 28, 2017, the disclosures of which are fully incorporated herein by reference.

TECHNICAL FIELD

Embodiments of the present disclosure are directed to wireless communications and, more particularly, to efficient encoding and decoding of public land mobile network (PLMN) information for long term evolution (LTE) equipment connected to a fifth generation (5G) core network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The Third Generation Partnership Project (3GPP) fifth generation (5G) wireless network includes both a new radio access (NR) and a new core network (5GC). The 5GC offers several new features such as support for network slicing, improved QoS, and latency and battery optimizations in the form of a new user equipment (UE) state referred to as inactive mode. To provide these features also in long term evolution (LTE) and to enable fast mobility between LTE and NR, the LTE eNB needs to support connectivity to 5GC. Together the LTE eNBs and NR gNBs connected to 5GC make up the next generation radio access network (NG-RAN).

The core network (CN) type(s) that an eNB is connected to is broadcasted in system information (SI). For radio access network (RAN) sharing, where multiple public land mobile networks (PLMNs) are hosted by the same eNB, the CN type(s) is determined separately for each PLMN. For each PLMN the LTE eNB can be connected to: (1) evolved packet core (EPC) only, (2) both EPC and 5GC or (3) 5GC only. Legacy UEs that only support the legacy non-access stratum (NAS) protocol (EPC NAS) can only connect to EPC, while new UEs are expected to support both the legacy and the new NAS protocol (5GC NAS) and can connect to both EPC and 5GC.

Because legacy UEs can only obtain service from cells with EPC connectivity, a mechanism is needed to prevent the legacy UEs from camping on cells which are only connected to 5GC. There are two possible cases: (a) all PLMNs are connected to 5GC only; or (b) some PLMNs are connected to 5GC only while some are connected to both EPC and 5GC or EPC only.

For the first scenario, the existing cellBarred flag in SIB1 may be used to prevent legacy UEs from camping on the cell. This flag is common for all PLMNs and can therefore only be used in the first scenario. By letting the new UEs (i.e., UEs capable of 5GC NAS) ignore the flag, the legacy UEs will be blocked while the new UEs are allowed through. To provide the current cell barring flag functionality for new UEs, a corresponding new flag may be used in SIB1 for the new UEs (e.g., "cellBarred-5GC").

For the second scenario, one possible solution is to broadcast two PLMN lists in SI: the first one is the existing/legacy PLMN list containing the PLMNs which are connected to EPC, and the second one is a new PLMN list containing the PLMNs which are connected to 5GC. PLMNs which are connected to both EPC and 5GC occur on both lists. Because a legacy UE only reads the legacy PLMN list, it will only select a PLMN and cell which is connected to EPC.

SUMMARY

Based on the description above, there currently exist certain challenges when a network node is connected to more than one core network type. For example, in addition to the public land mobile network (PLMN) information, other cell access related information is broadcasted in system information block one (SIB1) in longer term evolution (LTE). Because SIB1 is acquired at every cell re-selection and handover, it is important to keep its size as small as possible to minimize the acquisition time. Therefore, reducing the size of the PLMN information is beneficial.

Certain aspects of the present disclosure and their embodiments may provide solutions to these or other challenges. As described above, two separate PLMN lists may be broadcasted in SIB1 for LTE cells connected to both evolved packet core (EPC) and fifth generation core (5GC): the first one is the existing/legacy PLMN list containing the PLMNs that are connected to EPC, and the second one is a PLMN list containing the PLMNs that are connected to 5GC. In the following, the two PLMNs lists are referred to as the EPC and 5GC PLMN list, respectively.

Particular embodiments reduce the size of the 5GC PLMN list by avoiding duplicating information for PLMNs that are connected to both EPC and 5GC. Rather than repeating the PLMN information for the PLMNs in both lists, the PLMN is only described in the EPC PLMN list and a reference to this entry is then included in the 5GC PLMN list.

In some embodiments, a bitmap may mark the PLMNs in the EPC PLMN list that are also connected to 5GC. The 5GC PLMN list may only contain the PLMNs that are connected to 5GC only. As most PLMNs are likely to be connected to both EPC and 5GC, particular embodiments can significantly reduce the size of the PLMN information in SIB1.

According to some embodiments, a method performed by a wireless device for efficient decoding of PLMN information comprises receiving a message comprising PLMN information for a plurality of cells. The method also includes determining PLMN information from the message for a first group of cells. The first group of cells comprises at least one cell. Each cell of the first group of cells is associated with a first core network type. The method additionally includes determining PLMN information from the message for a second group of cells. The second group of cells comprises at least one cell. Each cell of the second group of cells is associated with a second core network type. A least one cell is a part of the first group of cells and the second group of cells. The PLMN information for the at least one cell in the first group of cells and the second group of cells is provided only once.

In particular embodiments, the PLMN information of the message comprises a first list associated with the first group of cells and a second list associated with the second group of cells.

In particular embodiments, determining PLMN information for the at least one cell that is a part of the first group of cells and the second group of cells comprises applying a bitmap to the cells of the first group of cells. Each bit of the bitmap corresponds to a cell in the first group of cells. The bitmap identifies each cell of the first group of cells that is also in the second group of cells. The PLMN information for the at least one cell with respect to the second core network type is based on the PLMN information for the corresponding cell with respect to the first core network type.

In particular embodiments the message comprises a flag to indicates if the cellReservedForOperatorUse field per cell in the first group of cells is valid for the corresponding cell in the second group of cells.

In particular embodiments, determining PLMN information for the second group of cells comprises, for each cell of the second group of cells that is also associated with the first group of cells, following a reference to the PLMN information in the first group of cells.

In particular embodiments, the method further comprises maintaining a first list comprising PLMN information for each cell of the first group of cells and a second list comprising PLMN information for each cell of the second group of cells.

In particular embodiments, the message may be a system information block message or an RRC message.

In particular embodiments the method may also include providing user data and forwarding the user data to a host computer.

According to some embodiments, a method performed by a base station for efficient encoding of PLMN information comprises determining a core network type associated with each cell of a plurality of cells. The method also includes identifying at least one cell associated with multiple core network types. The method further includes transmitting a message to a wireless device. The message comprises PLMN information for each cell associated with a first core network type and each cell associated with only a second core network type. The PLMN information with respect to the second core network type for the at least one cell associated with multiple core network types may be derived from the PLMN information associated with the at least one cell with respect to the first core network type.

In particular embodiments, the PLMN information of the message comprises a first list of cells associated with the first core network type and a second list of cells associated with the second core network type.

In particular embodiments, the method also includes generating a bitmap indicating which cells associated with the first core network type are also associated with the second core network type.

In particular embodiments, the message comprises the bitmap. In some embodiments the message comprises a flag to indicate if the cellReservedForOperatorUse field per cell in the first group of cells is valid for the corresponding cell in the second group of cells.

In particular embodiments, the method may further comprise, for each of the at least one cell associated with multiple core network types, generating a reference to determine the PLMN information for the at least one cell with respect to the second core network type based on the PLMN information for the at least one cell with respect to the first core network type.

In some embodiments the message may be a system information block message or an RRC message.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantage(s) such as reducing the size of PLMN information for LTE connected to 5GC which in turn shortens the SIB1 acquisition time. Because SIB1 is acquired at cell (re)selection and handover, this in turn reduces cell (re)selection and handover delay.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
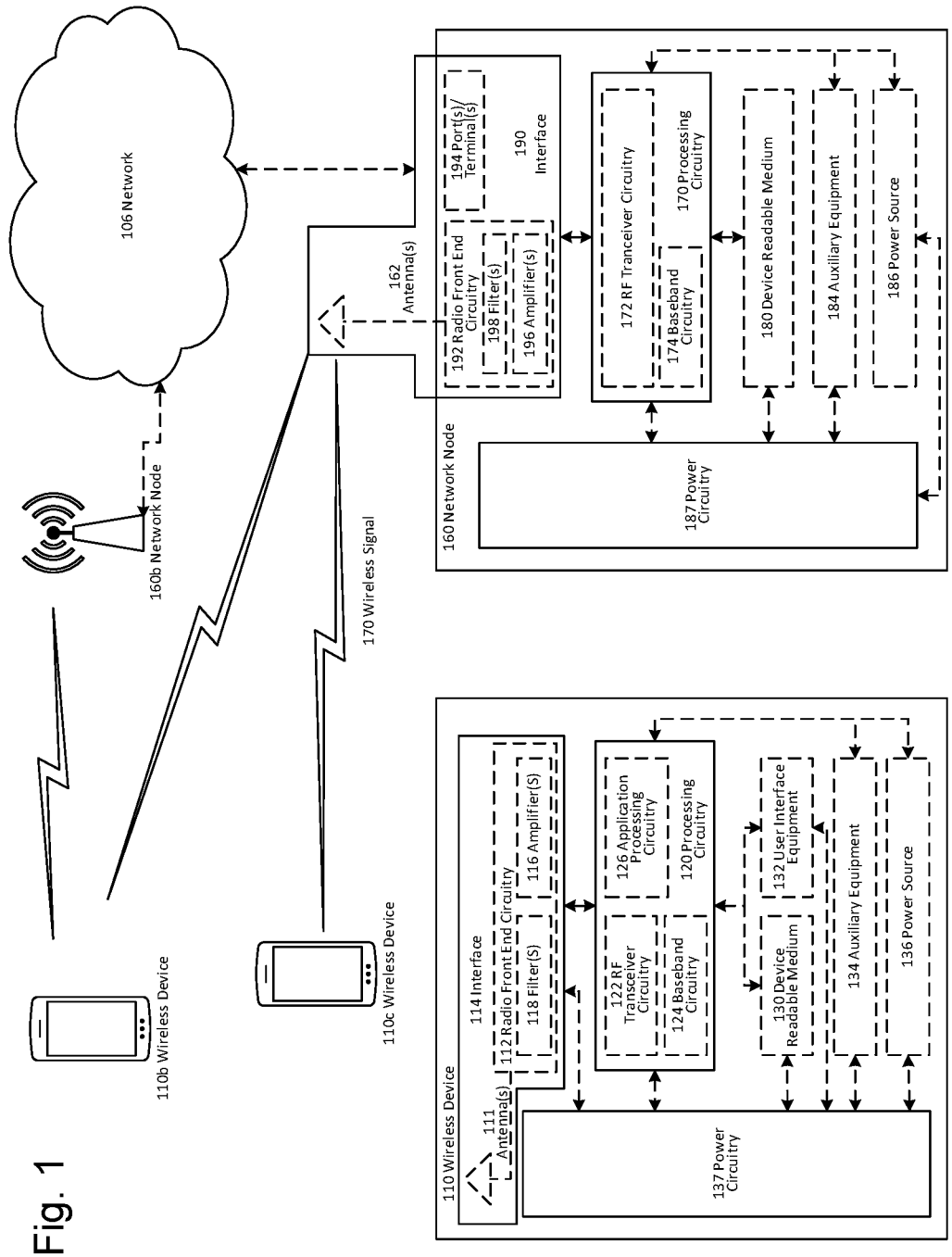
FIG. 1 is a block diagram illustrating an example wireless network.

As described above, certain challenges currently exist when a network node is connected to more than one core network type. For example, in addition to the public land mobile network (PLMN) information, other cell access related information is broadcasted in system information block one (SIB1) in longer term evolution (LTE). Because SIB1 is acquired at every cell re-selection and handover, it is important to keep its size as small as possible to minimize the acquisition time. Therefore, reducing the size of the PLMN information is beneficial.

Certain aspects of the present disclosure and their embodiments may provide solutions to these or other challenges. Particular embodiments are described with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. Particular embodiments include reducing the size of the PLMN information in SIB1 by avoiding duplication of PLMN specific information including PLMN ID for PLMN's that are connected to both evolved packet core (EPC) and fifth generation core network (5GCN). In some embodiments, if a PLMN is connected to both EPC and 5GCN, the PLMN information (e.g., PLMN ID, cell-ReservedForOperatorUse) is included in the EPC PLMN list and a reference to this entry is included in the 5GC list. In these embodiments, the PLMN is only described once, which avoids duplicating the same information in two places. Another benefit is that the user equipment (UE) directly sees which PLMNs are connected to both EPC and 5GC.

An example of how particular embodiments may be encoded in ASN.1 in TS 36.331 is shown below. Note that maxPLMN-r11 (=6) is a constant that specifies the maximum number of entries that can be included in the legacy EPC PLMN list. The example assumes that the same limit is used also for the 5GC PLMN list. The field mapped contains the reference to the EPC PLMN list.

SystemInformationBlockType1 Message

```
-- ASN1START
SystemInformationBlockType1-BR-r13 ::=
    SystemInformationBlockType1
SystemInformationBlockType1 ::=            SEQUENCE {
    cellAccessRelatedInfo                  SEQUENCE {
        plmn-IdentityList                  PLMN-
IdentityList,
        trackingAreaCode
TrackingAreaCode,
        cellIdentity
CellIdentity,
        cellBarred
ENUMERATED {barred, notBarred},
        intraFreqReselection               ENUMERATED
{allowed, notAllowed},
        csg-Indication                     BOOLEAN,
        csg-Identity                       CSG-Identity
            OPTIONAL -- Need OR
    },
    cellSelectionInfo                      SEQUENCE {
        q-RxLevMin                         Q-
RxLevMin,
        q-RxLevMinOffset                   INTEGER
(1..8)            OPTIONAL -- Need OP
    },
    p-Max                                  P-Max
                OPTIONAL, -- Need OP
    freqBandIndicator
    FreqBandIndicator,
    schedulingInfoList
    SchedulingInfoList,
    tdd-Config                             TDD-Config
                OPTIONAL, -- Cond TDD
    si-WindowLength                        ENUMERATED
                                           {
                                             ms1,
    ms2, ms5, ms10, ms15, ms20,
                                             ms40},
    systemInfoValueTag                     INTEGER (0..31),
    nonCriticalExtension
    SystemInformationBlockType1-v890-IEs   OPTIONAL
}
<text omitted>
SystemInformationBlockType1-v15xy-IEs ::=  SEQUENCE {
    cellAccessRelatedInfo-5GC              SEQUENCE {
        plmn-IdentityList-5GC              PLMN-
IdentityList-5GC,
        cellBarred-5GC                     ENUMERATED
{barred, notBarred}
    },
    nonCriticalExtension                   SEQUENCE { }
}
    PLMN-IdentityList-5GC ::= SEQUENCE (SIZE (1..maxPLMN-r11))
OF PLMN-IdentityInfo-5GC
    PLMN-IdentityInfo-5GC ::=              SEQUENCE {
    plmn-IdentityInfo CHOICE {
        fullInfo           PLMN-IdentityInfo,
        mapped                  INTEGER (1..maxPLMN-r11)
    }
}
-- ASN1STOP
```

In some embodiments, SIB1 may include a separate bitmap to indicate whether a PLMN in the EPC PLMN list is also connected to 5GC. The length of the bitmap is the same as the maximum number of PLMNs and each bit corresponds to an entry in the EPC PLMN list. If a bit is set, then the corresponding PLMN is also connected to 5GC. The 5GC PLMN list is still needed for the PLMNs that are connected to 5GC only because they do not have a corresponding entry in the EPC PLMN list. An example of how particular embodiments can be encoded in ASN.1 in TS 36.331 is shown below. The bitmap described above is contained in the field plmnsConnectedToEPCand5GC. Also note that, similar to the example above, the maximum number of entries in the 5GC PLMN list is assumed to be the same as in the EPC PLMN list.

SystemInformationBlockType1 Message

```
-- ASN1START
SystemInformationBlockType1-BR-r13 ::=
    SystemInformationBlockType1
SystemInformationBlockType1 ::=            SEQUENCE {
    cellAccessRelatedInfo                  SEQUENCE {
        plmn-IdentityList                  PLMN-
IdentityList,
        trackingAreaCode
TrackingAreaCode,
        cellIdentity
CellIdentity,
        cellBarred
ENUMERATED {barred, notBarred},
        intraFreqReselection               ENUMERATED
{allowed, notAllowed},
        csg-Indication                     BOOLEAN,
        csg-Identity                       CSG-Identity
            OPTIONAL -- Need OR
    },
    cellSelectionInfo                      SEQUENCE {
        q-RxLevMin                         Q-
RxLevMin,
        q-RxLevMinOffset                   INTEGER
(1..8)            OPTIONAL -- Need OP
    },
    p-Max                                  P-Max
                OPTIONAL, -- Need OP
```

```
    freqBandIndicator
    FreqBandIndicator,
    schedulingInfoList
    SchedulingInfoList,
    tdd-Config                                  TDD-Config
                         OPTIONAL, -- Cond TDD
    si-WindowLength                             ENUMERATED {
                                                    ms1,
ms2, ms5, ms10, ms15, ms20,
                                                    ms40},
    systemInfoValueTag                          INTEGER (0..31),
    nonCriticalExtension
    SystemInformationBlockType1-v890-IEs        OPTIONAL
}
<text omitted>
SystemInformationBlockType1-v15xy-IEs ::=      SEQUENCE {
    cellAccessRelatedInfo-5GC                   SEQUENCE {
        plmnsConnectedToEPCand5GC               BIT STRING
(maxPLMN-r11)),
        plmn-IdentityList-5GC                   PLMN-
IdentityList,
        cellBarred-5GC                          ENUMERATED
{barred, notBarred}
    },
    nonCriticalExtension                        SEQUENCE { }
}
-- ASN1STOP
```

Some embodiments include an additional flag alongside the bitmap described above. The flag maps the IE cellReservedForOperatorUse from EPC to 5GC. The field cellReservedForOperatorUse is part of the PLMN information and is defined per PLMN in EPC PLMN list.

The flag indicates if the cellReservedForOperatorUse field per PLMN in the EPC PLMN list is valid for 5GC as well. If the flag is set, then the value of the cellReservedForOperatorUse field is the same for the mapped PLMN (i.e., the PLMN whose bit is set in the bitmap). If the flag is not set, then the cellReservedForOperatorUse field is redefined for each of the mapped PLMNs.

One advantage of the additional flag is that the cellReservedForOperatorUse can have different values for EPC and 5GC for PLMNs connected to both EPC and 5GC. The same idea can be applied for other information elements included in the PLMN information that are set for each of the EPC PLMNs (e.g., the Tracking Area Code (TAC)).

An example of how particular embodiments can be encoded in ASN.1 in TS 36.331 is shown below. The 5GC specific value of the cellReservedForOperatorUse field (denoted cellReservedForOperatorUse-5GC) is included in the information element PLMN-DeltaIdentityInfo-5GC, which is set per PLMN in the list the plmn-DeltaIdentityList-5GC. The number of elements in plmn-DeltaIdentityList-5GC is the same as the number of bits set in the bitmap (i.e., each list element corresponds to a mapped PLMN). Note that plmn-DeltaIdentityList-5GC is optional and the optionality flag functions as the "additional flag" described above.

SystemInformationBlockType1 Message

```
-- ASN1START
SystemInformationBlockType1-BR-r13 ::=
    SystemInformationBlockType1
SystemInformationBlockType1 ::=                SEQUENCE {
    cellAccessRelatedInfo                       SEQUENCE {
        plmn-IdentityList                       PLMN-
IdentityList,
        trackingAreaCode
```

```
        TrackingAreaCode,
        cellIdentity
        CellIdentity,
        cellBarred
        ENUMERATED {barred, notBarred},
            intraFreqReselection                ENUMERATED
{allowed, notAllowed},
            csg-Indication                      BOOLEAN,
            csg-Identity                        CSG-Identity
                 OPTIONAL -- Need OR
    },
    cellSelectionInfo                           SEQUENCE {
        q-RxLevMin                              Q-
RxLevMin,
        q-RxLevMinOffset                        INTEGER
(1..8)             OPTIONAL -- Need OP
    },
    p-Max                                       P-Max
                         OPTIONAL, -- Need OP
    freqBandIndicator
    FreqBandIndicator,
    schedulingInfoList
    SchedulingInfoList,
    tdd-Config                                  TDD-Config
                         OPTIONAL, -- Cond TDD
    si-WindowLength                             ENUMERATED {
                                                    ms1,
ms2, ms5, ms10, ms15, ms20,
                                                    ms40},
    systemInfoValueTag                          INTEGER (0..31),
    nonCriticalExtension
    SystemInformationBlockType1-v890-IEs        OPTIONAL
}
<text omitted>
SystemInformationBlockType1-v15xy-IEs ::=      SEQUENCE {
    cellAccessRelatedInfo-5GC                   SEQUENCE {
        plmnsConnectedToEPCand5GC               BIT STRING
(maxPLMN-r11)),
        plmn-DeltaIdentityList-5GC              PLMN-
DeltaIdentityList,
        plmn-IdentityLisCt-5GC                  PLMN-
IdentityList,
        cellBarred-5GC                          ENUMERATED
{barred, notBarred}
    },
    nonCriticalExtension                        SEQUENCE { }
}
PLMN-DeltaIdentityList-5GC ::= SEQUENCE (SIZE (1..maxPLMN-
r11)) OF PLMN-DeltaIdentityInfo-5GC
PLMN-DeltaIdentityInfo-5GC ::=
    SEQUENCE {
    cellReservedForOperatorUse-5GC
    ENUMERATED {reserved, notReserved}
}
-- ASN1STOP
```

Although the description above assumes the 5GC PLMN information is included in SIB1, in other embodiments the PLMN information be included in another SIB. The reason SIB1 is assumed is because SIB1 is generally used for cell access related information. To reference a PLMN connected to EPC and/or 5GC in, for example RRC signaling, each PLMN may be assigned an index. The index can be assigned in various ways.

A first option uses separate index sets for the EPC and the 5GC PLMNs (e.g., the EPC PLMN list is indexed 1 . . . n and the 5GC PLMN list is indexed 1 . . . m). A drawback of the first option is that an index alone will not indicate what core network is referred to.

A second option indexes the PLMNs in the EPC list 1 . . . n and the PLMN's in the 5GC list from n+1 . . . n+m. An advantage of the second option is that it is possible to implicitly indicate core network type simply by using the PLMN index. However, specific core network is not indicated for index 1 . . . n if a bitmap is used to indicate PLMN's that support 5GC from the EPC PLMN list.

A third option is an embodiment where a bitmap indicates which PLMN's in the EPC-list also support connection to 5GC (but are not listed in the 5GC PLMN list). Then it is not sufficient to only index according to option 2. In this embodiment, indexing could be: EPC list: 1 ... n; PLMNs in EPC list that also support 5GC (indicated in bitmap): n+1 ... n+k, where k is the number of PLMN's in the EPC list that also support 5GC; and 5GC list: (n+k)+1 ... (n+k)+m, where m is the number of PLMN's in the 5GC list.

A fourth option only indexes the PLMN's that support 5GC. In this case, there is no index assigned to the full EPC-list and the indexing will then instead be according to: PLMNs in EPC list that also support 5GC (indicated in bitmap):1 ... k, where k is the number of PLMN's in the EPC list that also support 5GC; and 5GC list: k+1 ... k+m, where m is the number of PLMN's in the 5GC list.

By using a common index set (e.g., like options 2-4, and in particular options 3 and 4 above) a benefit is that the core network is implicitly indicated by the PLMN index. In this way, if a specific index is referenced (e.g., in RRC signalling) the specific index not only indicates the specific PLMN, but also the specific core network. Separately signalling the core network type is not needed. The same PLMN may have two different indexes if it supports connection through both EPC and 5GC. These embodiments with a common index can be applied even if other parts disclosed herein are not used.

FIG. 1 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 2:
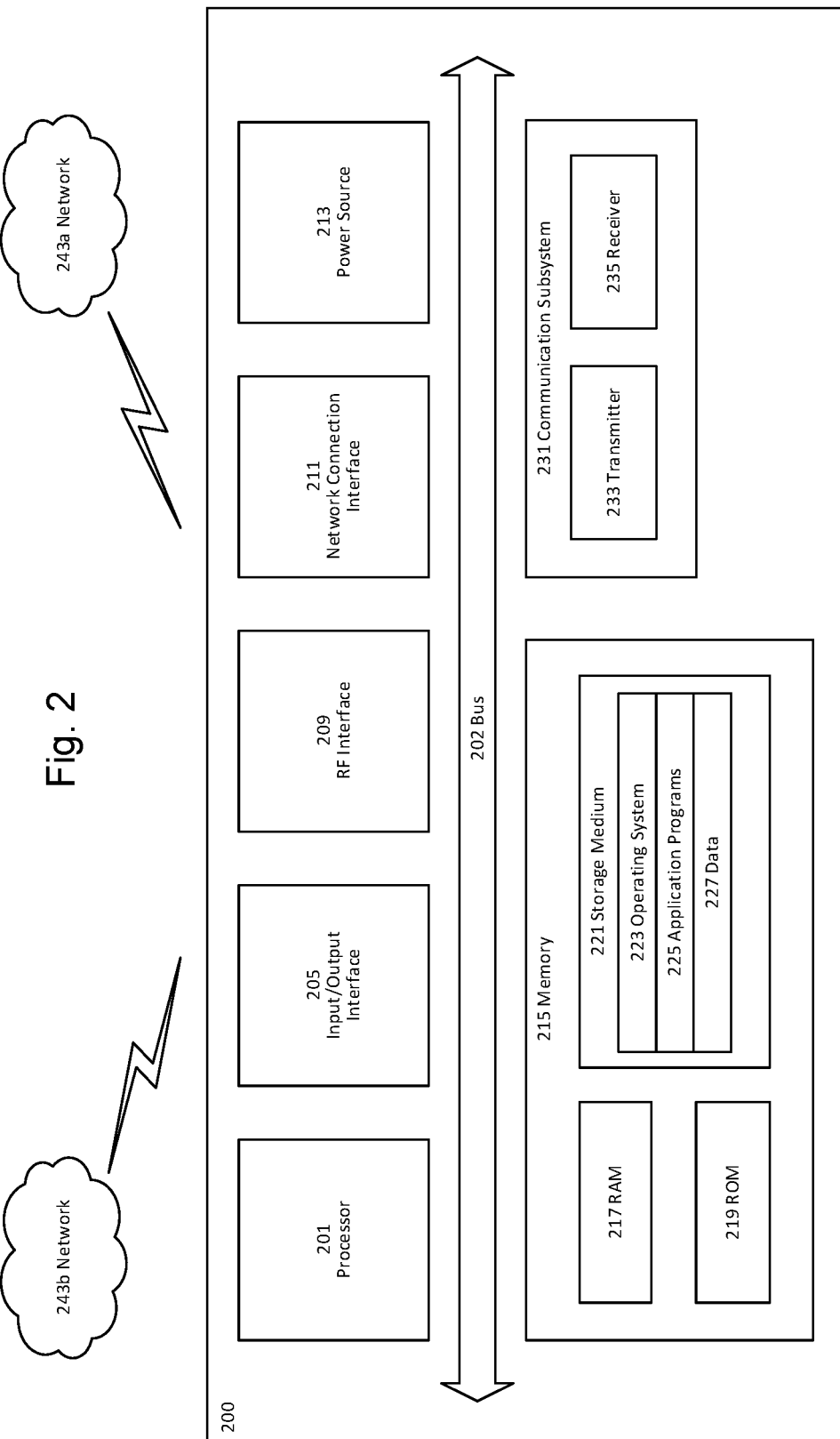
FIG. 2 illustrates an example user equipment, according to certain embodiments.

FIG. 2 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 2, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeably. Accordingly, although FIG. 2 is a UE, the components discussed herein are equally applicable to a WD, and vice-versa.

In FIG. 2, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 2, or only a subset of the components. The level of integration between the components may vary from one UE to another UE. Further, certain UEs may contain multiple instances of a component, such as multiple processors, memories, transceivers, transmitters, receivers, etc.

In FIG. 2, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 2, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 2, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 3:
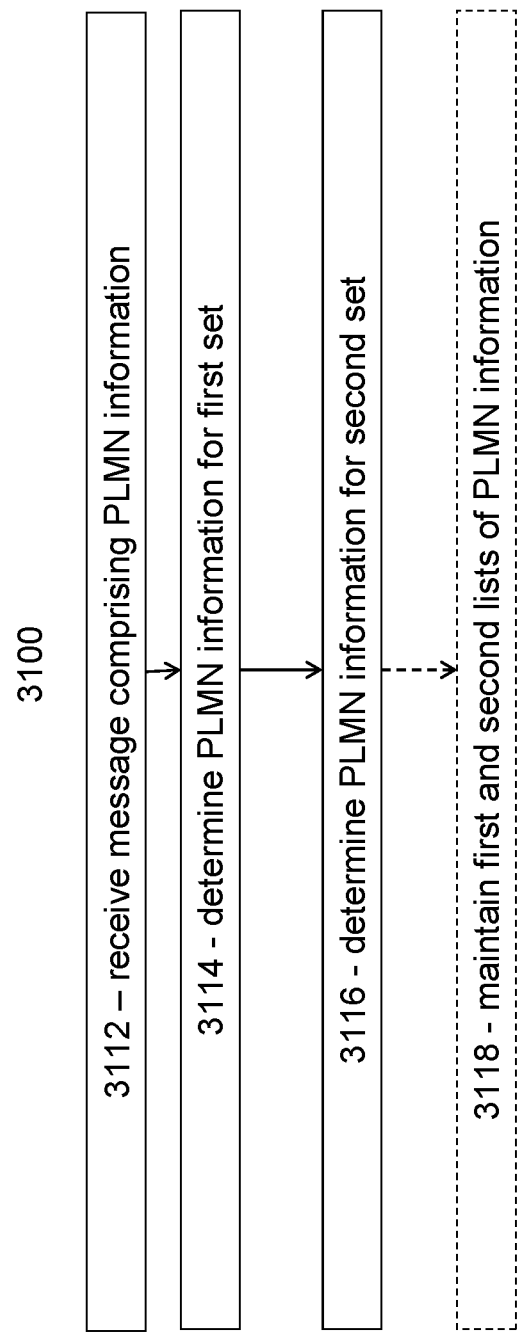
FIG. 3 illustrates a flowchart of an example method in a user equipment for decoding public land mobile network (PLMN) information, according to certain embodiments.

FIG. 3 illustrates a flowchart of an example method in a user equipment for decoding PLMN information, according to certain embodiments. In particular embodiments, one or more steps of FIG. 3 may be performed by wireless device 110 described with respect to FIG. 1.

The method begins at step 3112, where the wireless device receives the first message comprising the PLMN information for a plurality of cells. In some embodiments, the PLMN information may comprise a list of PLMN information for cells associated with the first core network type (e.g., EPC) and a list of PLMN information for cells associated with only the second core network type (e.g., 5GC). For those cells that are associated with both (e.g., EPC and 5GC), the PLMN information is provided only with respect to the list for the first core network type.

At step 3114, the wireless device determines the PLMN information from the first message for a first group of cells associated with the first core network type. For example, the wireless device may retrieve PLMN information for a group of cells associated with an EPC core network.

At step 3116, the wireless device determines PLMN information from the first message for a second group of cells. The second group of cells comprises at least one cell. Each cell of the second group of cells is associated with a second core network type (e.g., 5GC) and at least one cell is a part of the first group of cells and the second group of cells (e.g., EPC and 5GC).

The PLMN information for the at least one cell in the first group of cells and the second group of cells is provided only once. That is, rather than provide the PLMN information for the cell with respect to the first core network type and again for the same cell for the second core network type, the PLMN is provided once with respect to the first core network type and then used again to derive the PLMN information for the cell with respect to the second core network type.

The PLMN information for those cells associated with both core network types may be determined in a variety of different ways. For example, the wireless device may apply a bitmap to the cells of the first group of cells. Each bit of the bitmap corresponds to a cell in the first group of cells, such that if a bit is set (e.g., 1) then the PLMN information for that cell may be used or copied for that corresponding cell with respect to the second network core type.

As another example, for each cell that has an association with both the first and second network core types, the first message may include a reference a reference for the second core network type to a corresponding cell associated with the first core network type. For example, in the list of cells that are associated with the second network core type, there may be one or more references (depending on the number of cells that are associated with multiple core network types) to PLMN information in the list of cells that are associated with the first network core type. Particular embodiments may include any of the embodiments and examples described above for indicating which cells are part of which group.

At step 3118, the wireless device may maintain a first list comprising PLMN information for each cell of the first group of cells and a second list comprising PLMN information for each cell of the second group of cells.

Modifications, additions, or omissions may be made to method 3100 of FIG. 3. Additionally, one or more steps in the method of FIG. 3 may be performed in parallel or in any suitable order.

Figure 4:
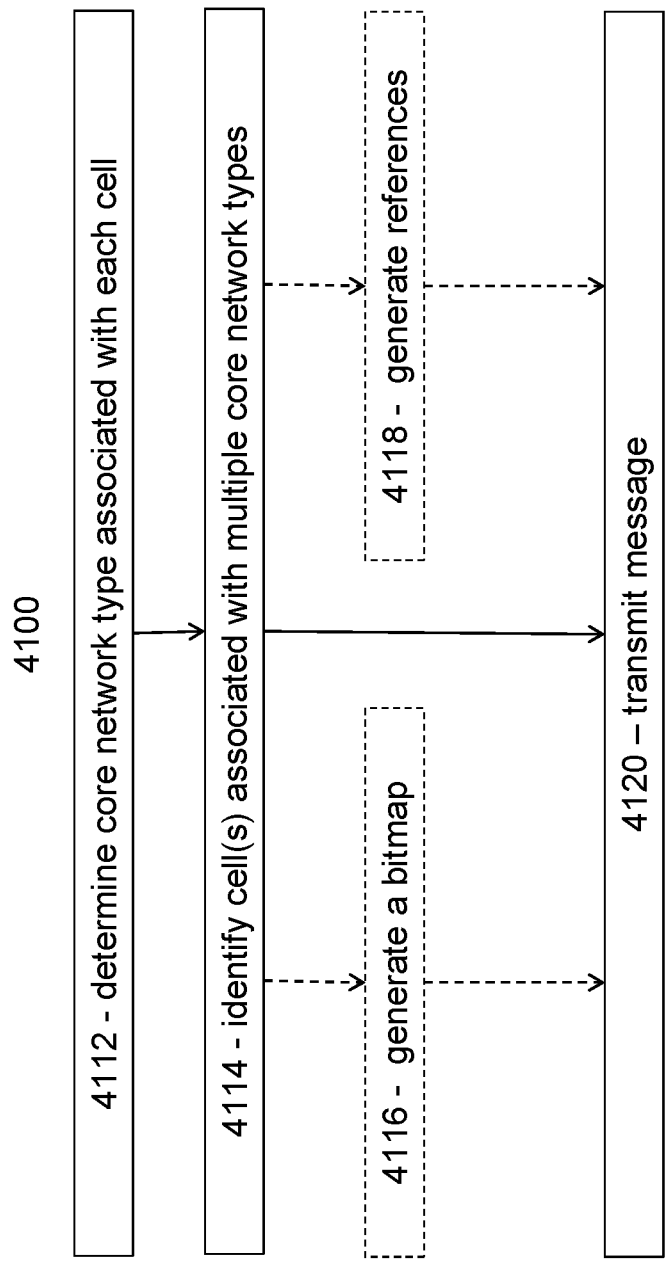
FIG. 4 illustrates a flowchart of an example method in a network node for encoding PLMN information, according to certain embodiments.

FIG. 4 illustrates a flowchart of an example method in a network node for encoding PLMN information, according to certain embodiments. In particular embodiments, one or more steps of FIG. 4 may be performed by network node 160 described with respect to FIG. 1.

The method begins at step 4112, where the network node determines a core network type associated with each cell of a plurality of cells. For example, network node 160 may determine whether a cell is connected to a EPC core network or a 5GC core network. Network node 160 may receive the information from network nodes 160 of the other cells, network node 160 may receive the information from its core network, network node 160 may be provisioned with the core network type associated with other cells, or network node 160 may determine the core network type in any other suitable manner.

At step 4114, the network node identifies at least one cell associated with multiple core network types. For example, a cell that is associated with an EPC and with a 5GC. Each of the cells identified as being associated with multiple core network types may only have the PLMN information provided once, along with a way to derive the PLMN information for the other/additional core network types.

For example, at step 4116 the network node could generate a bitmap to indicate which cells are associated with both core network types. As another example, at step 4118 the network node could provide a reference to the other/additional core network type from which the wireless device can determine the PLMN information.

At step 4118 the network node transmits a message to a wireless device. The message comprises PLMN information for each cell associated with a first core network type and each cell associated with only a second core network type. For those cells associated with multiple core network types, rather than repeat the PLMN information for the second core network type, the message may comprise information that can be used to derive the PLMN informant for the second core network type. In some embodiments, the first message may be a system information block message (e.g., SIB1). In some embodiments, the first message may be an RRC message.

Modifications, additions, or omissions may be made to method 4100 of FIG. 4. Additionally, one or more steps in the method of FIG. 4 may be performed in parallel or in any suitable order.

Figure 5:
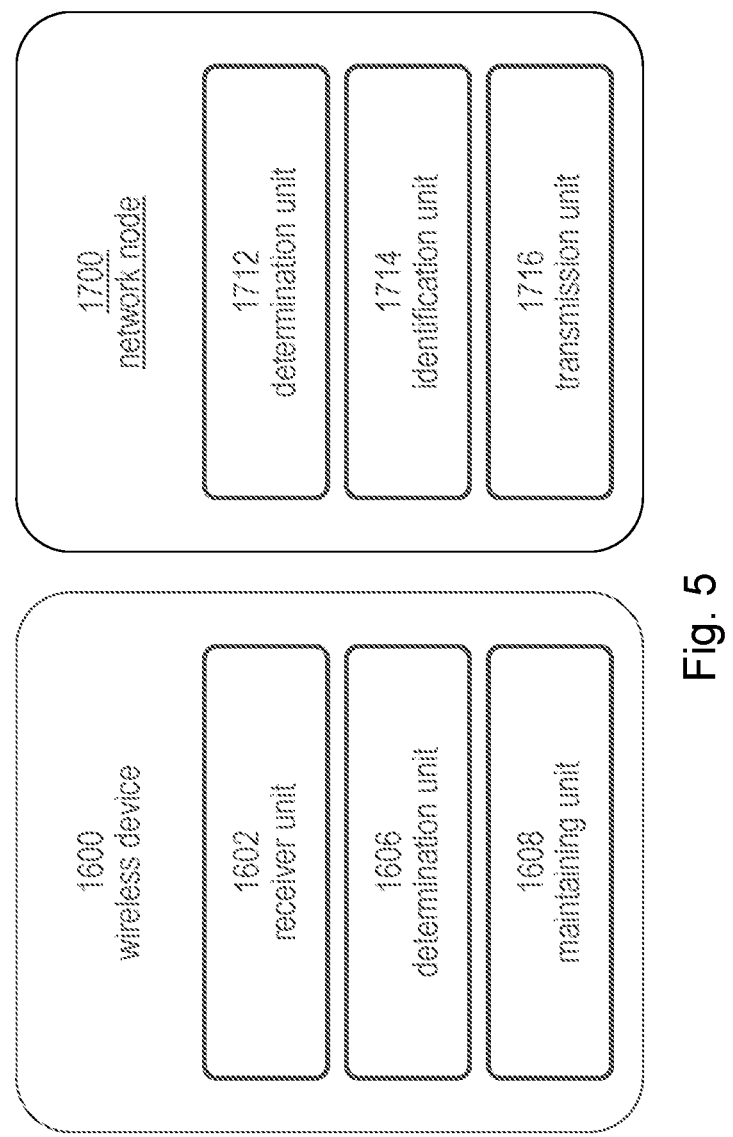
FIG. 5 illustrates a schematic block diagram of two apparatuses in a wireless network, according to certain embodiments.

FIG. 5 illustrates a schematic block diagram of two apparatuses in a wireless network (for example, the wireless network illustrated in FIG. 1). The apparatuses include a wireless device and a network node (e.g., wireless device 110 or network node 160 illustrated in FIG. 1). Apparatuses 1600 and 1700 are operable to carry out the example methods described with reference to FIGS. 3 and 4, respectively, and possibly any other processes or methods disclosed herein. It is also to be understood that the method of FIGS. 3 and 4 are not necessarily carried out solely by apparatus 1600 and/or apparatus 1700. At least some operations of the method can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiver unit 1602, determination unit 1606, and maintaining unit 1608, and any other suitable units of apparatus 1600 to perform corresponding functions according one or more embodiments of the present disclosure. Similarly, the processing circuitry described above may be used to cause determination unit 1712, identification unit 1714, and transmission unit 1716 and any other suitable units of apparatus 1700 to perform corresponding functions according one or more embodiments of the present disclosure As illustrated in FIG. 5, apparatus 1600 includes receiver unit 1602 configured to receive a first message comprising PLMN information for a plurality of cells. In some embodiments, the PLMN information of the first message comprises a first list associated with the first group of cells and a second list associated with the second group of cells. In some embodiments, the first message may comprise a flag to indicate if the cellReservedForOperatorUse field per cell in the first group of cells is valid for the corresponding cell in the second group of cells. In some embodiments, the first message is a system information block message. In some embodiments, the first message is an RRC message.

Apparatus 1600 also includes determination unit 1606 configured to determine PLMN information from the first message for a first and second group of cells. The first group of cells comprises at least one cell. Each cell of the first group of cells is associated with a first core network type. Some of them may also be associated with a second core network type.

The second group of cells comprises at least one cell. Each cell of the second group of cells is associated with a second core network type. At least one cell is a part of the first group of cells and the second group of cells. The PLMN information for the at least one cell in the first group of cells and the second group of cells is provided only once.

For example, with respect to the first group of cells some embodiments may use a bitmap that is applied to the first group of cells to identify which of those cells are associated with both network core types. Then, once identified, the PLMN information from those cells may be reused or copied for the second group of cells. As another example, the determination may be done by, for each cell of the second group of cells that is also associated with the first group of cells, following a reference to the PLMN information in the first group of cells Apparatus 1600 also includes maintaining unit 1608 configured to maintain a first list comprising PLMN information for each cell of the first group of cells and a second list comprising PLMN information for each cell of the second group of cells. Some of the PLMN information may be duplicated in the two lists.

As illustrated in FIG. 5, apparatus 1700 includes determination unit 1712 configured to determine a core network type associated with each cell of a plurality of cells. In some embodiments, determination unit 1712 may be further configured to generate a bitmap indicating which cells of associated with the first core network type are also associated with the second core network type. In some embodiments, for each of the at least one cell associated with multiple core network types determination unit 1712 may be configured to generate a reference that may be used to determine the PLMN information for the at least one cell with respect to the second core network type based on the PLMN information for the at least one cell with respect to the first core network type.

Apparatus 1700 also includes identification unit 1714 configured to identify at least one cell associated with multiple core network types.

Apparatus 1700 also includes transmission unit 1716 configured to transmit a message to a wireless device. The message comprises PLMN information for each cell associated with a first core network type and each cell associated with only a second core network type wherein the PLMN information with respect to the second core network type for the at least one cell associated with multiple core network types may be derived from the PLMN information associated with the at least one cell with respect to the first core network type.

In some embodiments, the first message may comprise a flag to indicate if the cellReservedForOperatorUse field per cell in the first group of cells is valid for the corresponding cell in the second group of cells. In some embodiments the first message is a system information block message. In some embodiments the first message is an RRC message. In some embodiments the PLMN information of the first message comprises a first list of cells associated with the first core network type and a second list of cells associated with the second core network type.

Figure 6:
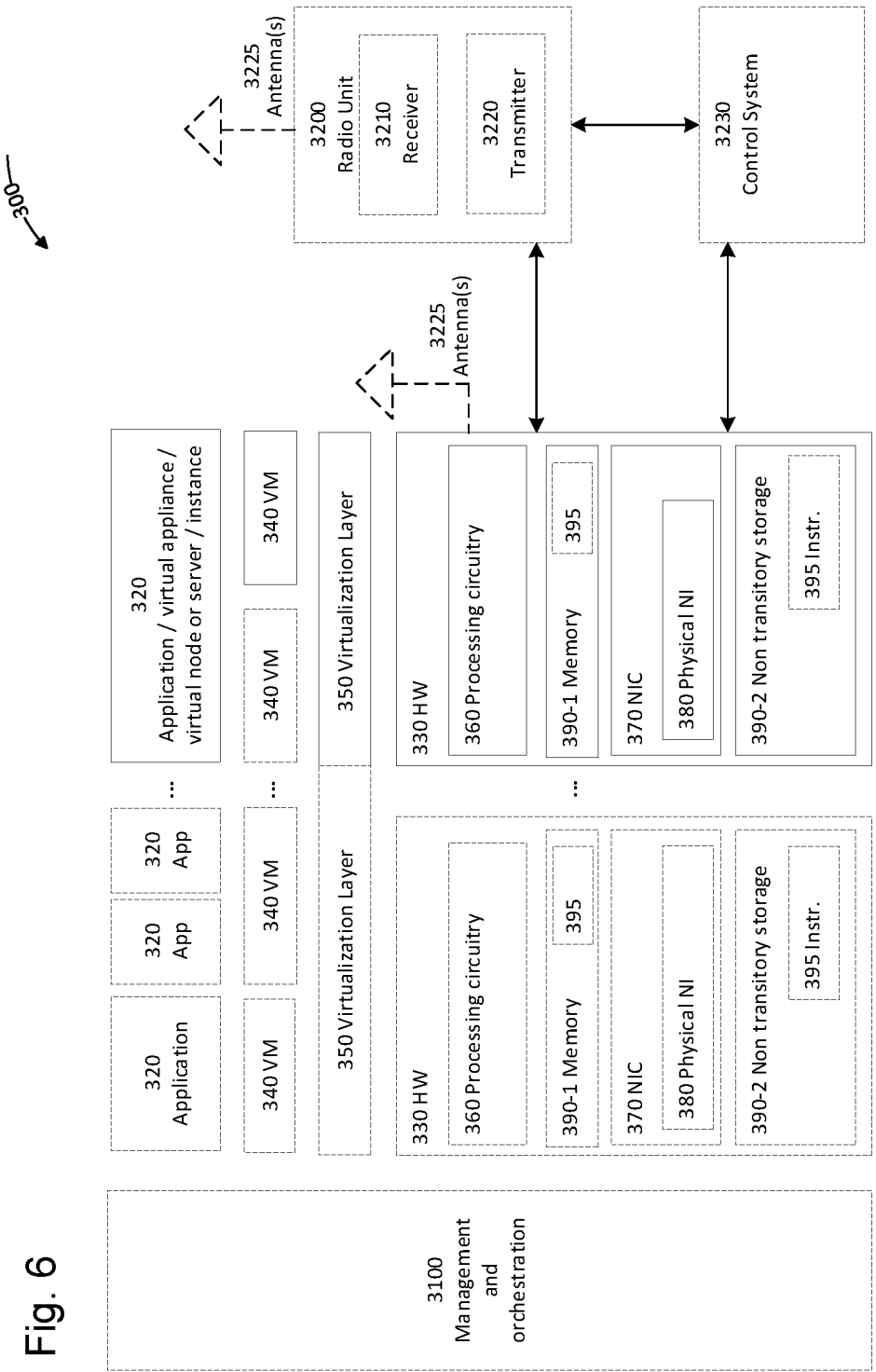
FIG. 6 illustrates an example virtualization environment, according to certain embodiments.

FIG. 6 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 6, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 7:
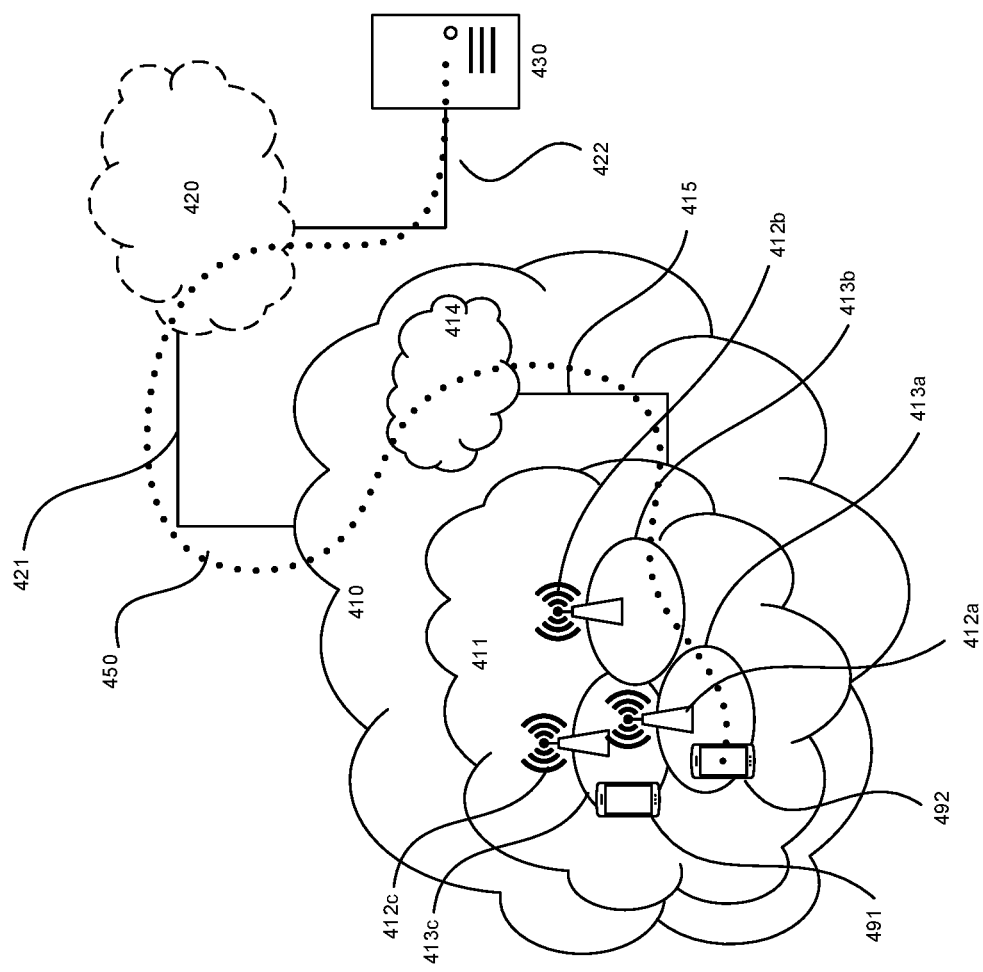
FIG. 7 illustrates an example telecommunication network connected via an intermediate network to a host computer, according to certain embodiments.

With reference to FIG. 7, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 7 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 8:
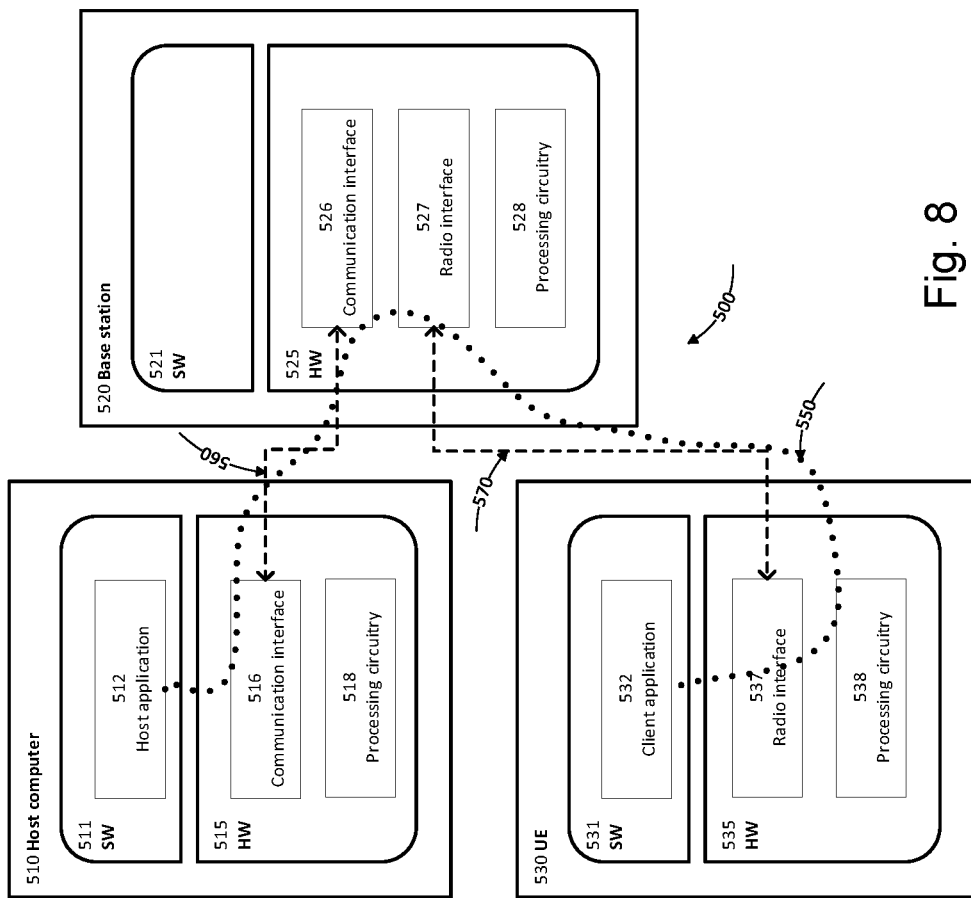
FIG. 8 illustrates an example host computer communicating via a base station with a user equipment over a partially wireless connection, according to certain embodiments.

FIG. 8 illustrates an example host computer communicating via a base station with a user equipment over a partially wireless connection, according to certain embodiments. Example implementations, in accordance with an embodiment, of the UE, base station and host computer discussed in the preceding paragraphs will now be described with reference to FIG. 20. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518.

Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 8) served by base station 520. Communication interface 526 may be configured to facilitate connection 560 to host computer 510. Connection 560 may be direct, or it may pass through a core network (not shown in FIG. 8) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 8 may be similar or identical to host computer 430, one of base stations 412*a*, 412*b*, 412*c* and one of UEs 491, 492 of FIG. 7, respectively. This is to say, the inner workings of these entities may be as shown in FIG. 5 and independently, the surrounding network topology may be that of FIG. 7.

In FIG. 8, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 9:
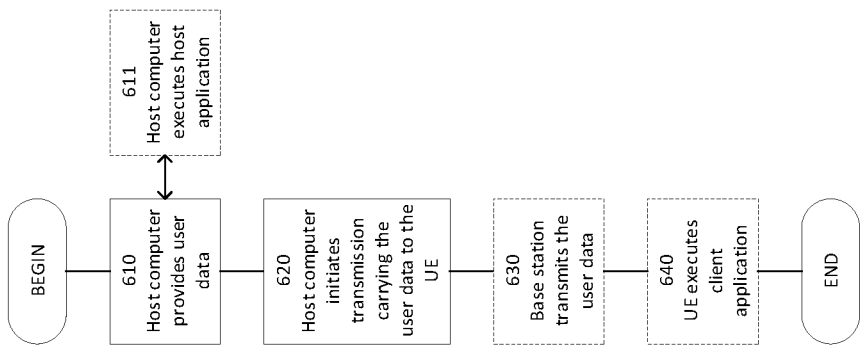
FIG. 9 is a flowchart illustrating a method implemented, according to certain embodiments.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 10:
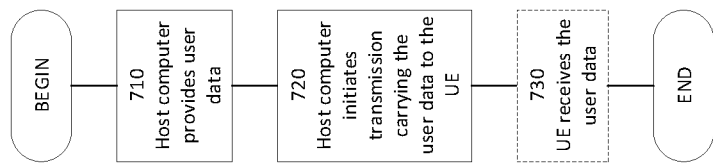
FIG. 10 is a flowchart illustrating a method implemented in a communication system, according to certain embodiments.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 11:
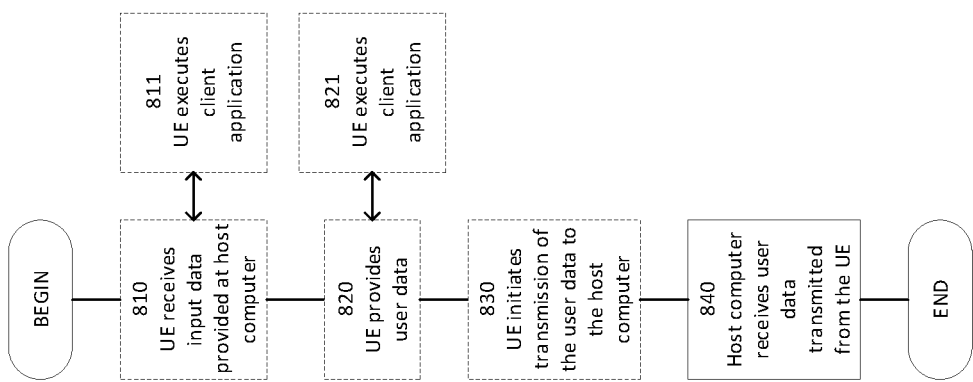
FIG. 11 is a flowchart illustrating a method implemented in a communication system, according to certain embodiments.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 12:
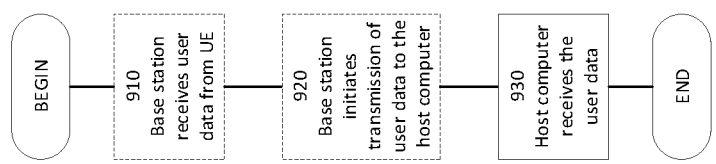
FIG. 12 is a flowchart illustrating a method implemented in a communication system, according to certain embodiments.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for decoding public land mobile network (PLMN) information, the method comprising:
receiving a message comprising PLMN information, the PLMN information comprising identification information for at least one PLMN associated with an evolved packet core (EPC) core network type wherein the message explicitly includes the identification information for the at least one PLMN associated with the EPC core network type and does not explicitly include identification information for at least one PLMN associated with a 5G Core core network type;
determining the PLMN information for at least one PLMN associated with the 5G core (5GC) core network type wherein determining the PLMN information for the at least one PLMN associated with the 5GC core network type comprises using an index that points to the identification information for the at least one PLMN associated with the EPC core network type; and accessing a first cell, the first cell associated with both the EPC core network type and the 5GC core network type.

2. The method of claim 1, wherein the PLMN information of the message comprises a first list of cells associated with the EPC core network type and a second list of cells that are associated with both core network types.

3. The method of claim 2, wherein determining PLMN information for the at least one PLMN associated with the 5GC core network type comprises, for each cell of the second group of cells that is also associated with the first group of cells, following a reference to the PLMN information in the first group of cells.

4. The method of claim 1, wherein the message is a system information block message.

5. The method of claim 1, wherein the message is a radio resource control (RRC) message.

6. A wireless device operable to decode public land mobile network (PLMN) information, the wireless device comprising processing circuitry operable to:
receive a message comprising PLMN information, the PLMN information comprising identification information for at least one PLMN associated with an evolved packet core (EPC) core network type, wherein the message explicitly includes the identification information for the at least one PLMN associated with the EPC core network type and does not explicitly include identification information for at least one PLMN associated with a 5G Core core network type;
determine the PLMN information for at least one PLMN associated with the 5G core (5GC) core network type wherein determining the PLMN information for the at least one PLMN associated with the 5GC core network type comprises using an index that points to the identification information for the at least one PLMN associated with the EPC core network type; and
access a first cell, the first cell associated with both the EPC core network type and the 5GC core network type.

7. The wireless device of claim 6, wherein the PLMN information of the message comprises a first list of cells associated with the EPC core network type and a second list of cells that are associated with both core network types.

8. The wireless device of claim 7, wherein the processing circuitry configured to determine PLMN information for at least one PLMN associated with the 5GC core network type comprises processing circuitry configured to, for each cell of the second group of cells that is also associated with the first group of cells, follow a reference to the PLMN information in the first group of cells.

9. The wireless device of claim 6, wherein the message is a system information block message.

10. The wireless device of claim 6, wherein the message is a radio resource control (RRC) message.

* * * * *